United States Patent
Zucker et al.

(10) Patent No.: US 8,477,180 B2
(45) Date of Patent: Jul. 2, 2013

(54) SYSTEM AND METHOD FOR CONFIGURING AN INFORMATION HANDLING SYSTEM TO PRESENT STEREOSCOPIC IMAGES

(75) Inventors: Brian T. Zucker, Austin, TX (US); Thomas A. Shows, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 1228 days.

(21) Appl. No.: 12/339,433

(22) Filed: Dec. 19, 2008

(65) Prior Publication Data
US 2010/0157023 A1  Jun. 24, 2010

(51) Int. Cl.
*H04N 13/00* (2006.01)

(52) U.S. Cl.
USPC .......................................... 348/51; 709/230

(58) Field of Classification Search
USPC ...................... 348/51–60; 709/230
See application file for complete search history.

(56) References Cited

U.S. PATENT DOCUMENTS

| 5,619,256 A | * | 4/1997 | Haskell et al. ................. 348/43 |
| 6,831,950 B2 | | 12/2004 | Penain et al. |
| 8,166,473 B2 | * | 4/2012 | Kinsey et al. .................... 718/1 |
| 2005/0041736 A1 | | 2/2005 | Butler-Smith et al. |
| 2006/0242641 A1 | * | 10/2006 | Kinsey et al. .................... 718/1 |

* cited by examiner

*Primary Examiner* — Kenneth R Coulter
(74) *Attorney, Agent, or Firm* — Terrile, Cannatti, Chambers & Holland, LLP; Robert W. Holland

(57) ABSTRACT

Three dimensional images are presented at an information handling system display using a communication protocol that the information handling system negotiates with a content source. Negotiation of a stereoscopic protocol supported by the information handling system from stereoscopic protocols available from the content source allows selection of one or more stereoscopic protocols that best fit content at the information handling system, such as based upon the resolution used to present images at the information handling system display.

15 Claims, 2 Drawing Sheets

SYSTEM AND METHOD FOR CONFIGURING AN INFORMATION HANDLING SYSTEM TO PRESENT STEREOSCOPIC IMAGES

BACKGROUND OF THE INVENTION

1. Field of the Invention

The present invention relates in general to the field of information handling system display presentations, and more particularly to a system and method for configuring an information handling system to present stereoscopic images.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are continuing to morph from enterprise devices that support business activities to entertainment devices that perform a number of entertainment functions. For example, portable information handling systems have an integrated display, speaker system and battery that allow presentation of audiovisual entertainment information in locations that do not have convenient access to power or fixed peripheral devices. End users often listen to music played from CD optical media or stored in a hard disk drive in one or more different formats. Similarly, end users often view movies played from DVD of Blu-ray Disk (BD) optical media or stored in a hard disk drive. Networking capabilities allow end users to download and play music and/or movies from various network locations in a variety of formats. Web pages downloaded with a web browser often include audiovisual content which is automatically presented to an end user. More recently, information handling systems have taken on roles traditionally assumed by televisions. For example, information handling systems present information in high definition television that is received from HDMI interfaces standardized in accordance with an HDMI specification. Digital television signals are communicated in compressed formats or uncompressed formats, such as DTV formats defined by EIA/CEA-861B standards.

Improved storage devices and network communication speeds have made the presentation of high definition images more practical on information handling systems. One example is the use of Blu-ray Disc (BD) players to present high definition movies with special effects. Stereoscopic images are created with a variety techniques that manipulate the presentation of images at a display. Different techniques for creating stereoscopic 3D images include information with different types of formats depending upon how the stereoscopic images are created at the display. Although consumer electronic devices comply with EIA/CEA standards that allow for negotiation of supported resolutions, matching the format of visual information presented at the device with the format used by the device typically involves manual negotiation of formats at the device until a suitable match with the content is found. In some instances, manual selection of a stereoscopic format at a display device will allow presentation of visual information with a degraded resolution because a more exacting match would better present desired images. Manual selection of stereoscopic format at an information handling system or other display device is often confusing to end users and detracts from the audiovisual experience.

SUMMARY OF THE INVENTION

Therefore a need has arisen for a system and method which automatically negotiates stereoscopic formats for presentation of stereoscopic images by an information handling system.

In accordance with the present invention, a system and method are provided which substantially reduce the disadvantages and problems associated with previous methods and systems for communication of stereoscopic information for presentation of stereoscopic images by an information handling system. A stereoscopic protocol for communicating stereoscopic information is negotiated from available protocols associated with content and supported protocols associate with the display of three dimensional images.

More specifically, an information handling system processes information through the cooperation of plural processing components, including stereoscopic three dimensional images presented at a display with a selected of plural formats. A display protocol negotiator negotiates a stereoscopic protocol with a content protocol negotiator to determine a stereoscopic protocol for communication of stereoscopic information to the information handling system from a content source. The display protocol negotiator provides the content protocol negotiator with supported protocols and display resolution to allow selection of a stereoscopic protocol from plural available stereoscopic protocols that is best fitted to communicate the stereoscopic information. Protocol tags inserted with the content identifies the type of protocol used to communicate the content and coordinates synchronization of the content for display.

The present invention provides a number of important technical advantages. One example of an important technical advantage is that stereoscopic formats of visual information are automatically negotiated by an information handling system so that stereoscopic images are presented with an optimal available rendering technique. Embedding stereoscopic formatting information within the visual information allows for rapid transitions between two and three dimensional image presentation with a selected of plural available three dimensional image rendering techniques. Embedded stereoscopic formatting information provides greater flexibility for rendering three dimensional images on a per frame basis so that content manufacturers have the ability to present three dimensional images with optimal effect.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Negotiation of a stereoscopic protocol between a content source and information handling system provides optimal three dimensional image presentation for a given information handling system display resolution. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
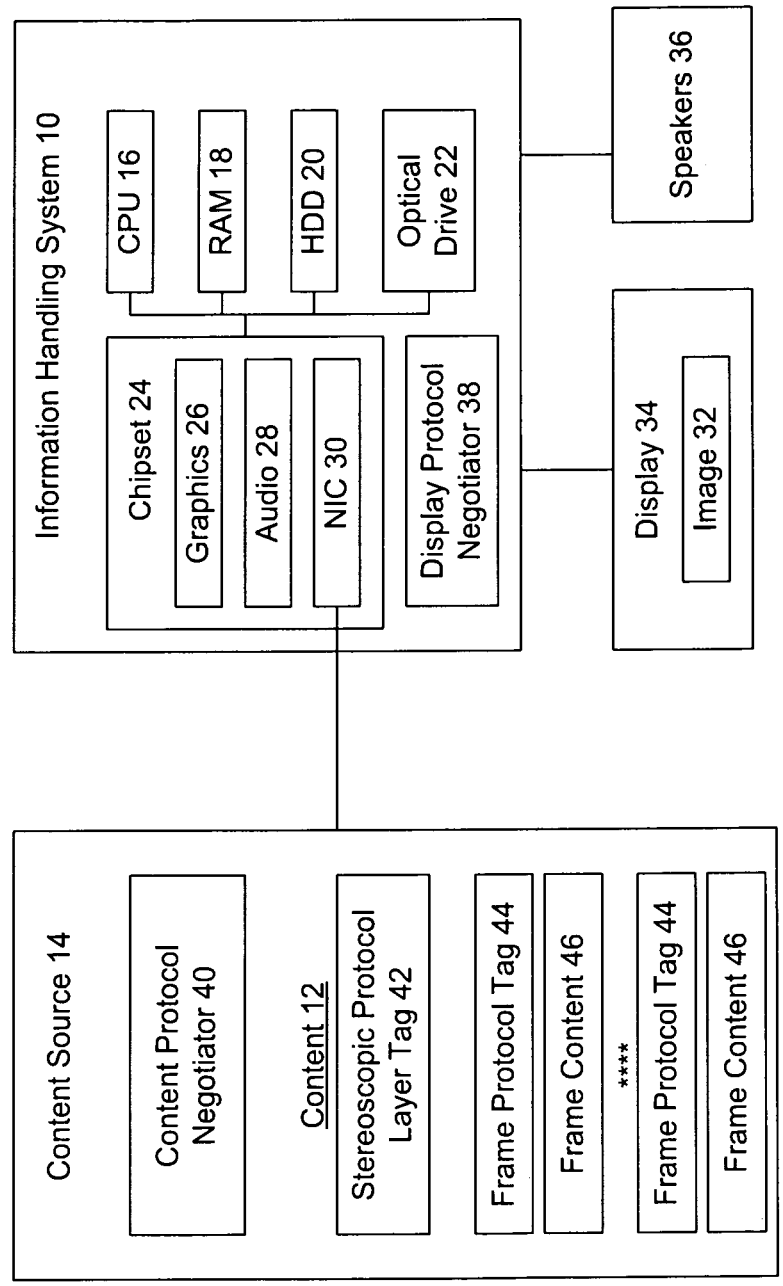
FIG. 1 depicts a block diagram of an information handling system that presents content provided from a content source using one or more negotiated stereoscopic protocols.

Referring now to FIG. 1, a block diagram depicts an information handling system 10 that presents content 12 provided from a content source 14 using one or more negotiated stereoscopic protocols. Information handling system 10 is built from plural processing components that cooperate to process information, such as a CPU 16, RAM 18, a hard disk drive 20, an optical drive 22 and a chipset 24 having a graphics subsystem 26, an audio subsystem 28 and a network interface card 30. For example, an application running on CPU 16 provides audiovisual information to chipset 24 so that graphics subsystem 26 can render a visual image 32 on a display 34 and audio subsystem 28 can render audible sounds from speakers 36. Examples of audiovisual information include movies retrieved from an optical medium played in optical drive 22 or a magnetic disk of hard disk drive 20. Another example of audiovisual information might include content 12 retrieved from a network location though a network interface supported by network interface card 30.

Information handling system 10 presents three dimensional images 32 at display 34 using a variety of different techniques. The optimal technique for presentation of three dimensional images depends, in part, on the resolution at the display 34. A display protocol negotiator 38 runs on one or more processing components to aid in retrieval of stereoscopic information using a stereoscopic protocol that supports a desired presentation technique. Display protocol negotiator 38 negotiates a desired stereoscopic protocol to use in retrieval of information from a content source 14 by communication with a content protocol negotiator 40 associated with content source 14. For example, content protocol negotiator 40 is logic located at a network address associated with desired content or stored on a medium with desired content, such as BD Java application that is retrieved to information handling system 10 and run on one or more processing components.

In operation, content protocol negotiator 40 provides available stereoscopic protocols to display protocol negotiator 38. Display protocol negotiator 38 responds by providing the protocols supported by information handling system 10 and resolution of the images presented at display 34. Content protocol negotiator 40 determines a best available protocol for communication of stereoscopic information and seeks confirmation that the determined protocol is supported by information handling system 10. Once the stereoscopic protocol is confirmed, content source 14 provides content with tags that identify stereoscopic information. Information handling system 10 renders the stereoscopic information at display 34 as three dimensional images with synchronized sound. The addition a stereoscopic tags to content communicated from a content source 14 to information handling system 10 allows negotiation of an appropriate stereoscopic format for three dimensional images. For example, a protocol layer tag 42 identifies the type of stereoscopic protocol in use while a frame protocol tag 44 associated with frame content 46 identifies content in need of three dimensional rendering. The use of tags allows different types of protocols to be used with a given content 12. The following are some examples of three dimensional presentation modes and descriptions that are used as protocol layer tags, although additional tags may be employed where protocol aliasing and addressing space permits. Each example includes 3 named protocol tags that are layered onto or inserted into content. The first tag is the mode that is used during negotiation of stereoscopic protocols between a content source and display to determine a preferred mode of presentation for a negotiated display resolution. Optional second and third tags listed after a mode tag are the per-frame protocol tags which allow synchronization between the content source and display. Tags are, for instance, used in conjunction with EIA/CEA-861B standards, such as section 6 and tables 8 through 13, and layered onto HDMI Auxiliary Video InfoFrames under HDMI 8.2.1 in such a way that each frame of video could contain or be preceded by a tag describing the stereoscopic three dimensional format used to transmit the visual information.

1. MODE_STEREO3D_NONE (stereo not supported)

This method is a reserved value for implementations where upstream requests may be made by the display source to determine stereoscopic mode. If none is available, this tag is transmitted to the display.

2. MODE_FR_FI, FR_FI_LEFT, FR_FI_RIGHT (Full resolution, frame interleave)

This method of transmitting stereoscopic 3D transmits the full resolution of the video, such as 1920×1080 p @ 60 Hz, interleaving left and right frames in the stream. For example, when transmitted at 60 Hz, 30 frames tagged as left (left eye) and 30 frames tagged as right (right eye) are interleaved in the order left/right/left/right and so on. Interlacing and interleaving are treated as completely separate protocol descriptors, in order that interleaved stereoscopic content may be transmitted in interlaced format or progressive scan, or any other suitable frame transmission method as the protocol permits.

3. MODE_HR_RI, HR_RI_LR, HR_RI_RL (Half resolution, row interleave)

This method of transmitting stereoscopic 3D transmits each pair of frames in one frame by merging them in a row interleaved format. The two half resolution frames combine into a single row interleaved, full resolution frame. The second and third parameters specify the intraframe ordering of the left and right pair. HR_LI_LR indicates that the first row corresponds to the left eye, second to the right eye, and so forth. HR_LI_RL indicates that the first row corresponds to the right eye, second to the left eye, and so forth.

4. MODE_HR_CI, HR_CI_LR, HR_CI_RL (Half resolution, column interleave)

This method of transmitting stereoscopic 3D transmits each pair of frames in one frame by merging them in a column interleaved format. The two half resolution frames combine into a single column interleaved, full resolution frame. The second and third parameters specify the intraframe ordering of the left and right pair. HR_CI_LR indicates that the first row corresponds to the left eye, second to the right eye, and so forth. HR_CI_RL indicates that the first row corresponds to the right eye, second to the left eye, and so forth.

5. MODE_HR_AB, HR_AB_LR, HR_AB_RL (Half resolution, above and below)

This method of transmitting stereoscopic 3D transmits each pair of frames in one frame by merging them with one above the other. The two half resolution frames combine into a single full resolution frame, with either the left occupying the upper half of the frame and right occupying the bottom half, or vice versa. HR_AB_LR indicates the left is on top of right, and HR_AB_RL indicates that the right is on top of the left.

6. MODE_HR_SS, HR_SS_LR, HR_SS_RL (Half resolution, side-by-side)

This method of transmitting stereoscopic 3D transmits each pair of frames in one frame by merging them side-by-side. The two half resolution frames combine into a single full resolution frame, with either the left on the left side and the right on the right side, or vice versa. HR_SS_LR indicates that left is left of right, and HR_SS_RL indicates that the right is left of the left.

Figure 2:
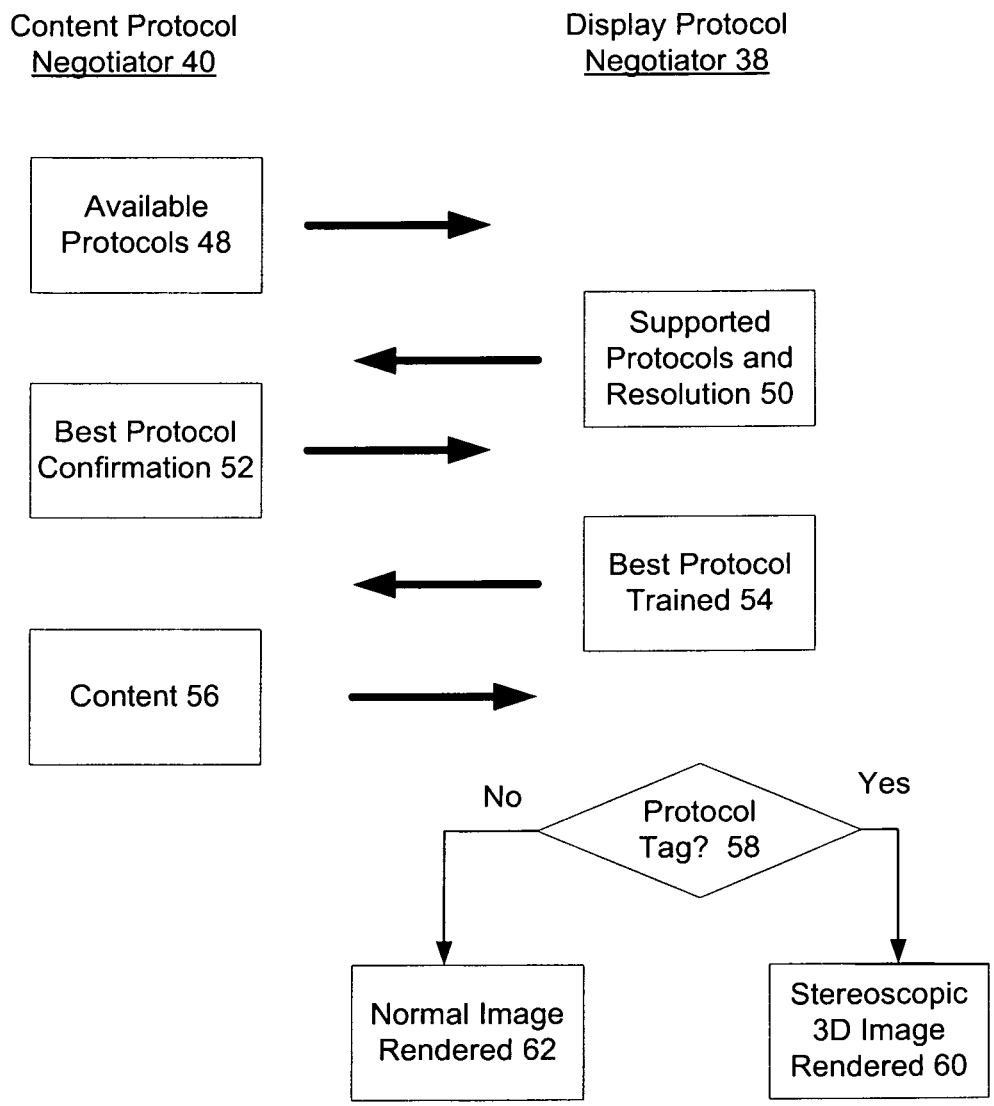
FIG. 2 depicts a flow diagram of a process for negotiation of a stereoscopic protocol between a content source and an information handling system.

Referring now to FIG. 2, a flow diagram depicts a process for negotiation of a stereoscopic protocol between a content source and an information handling system. The process begins at step 48 with the communication of available stereoscopic protocols from content protocol negotiator 40 to display protocol negotiator 38. At step 50, display protocol negotiator 38 responds with the protocols supported at the information handling system and the resolution of the display. At step 52, content protocol negotiator 40 determines a best supported protocol from the available protocols for the given resolution and provides the determined protocol to display protocol negotiator 38. At step 54, display protocol negotiator 38 confirms the determined stereoscopic protocol. In alternative embodiments, the best of available and supported protocols can be determined at the information handling system and sent to the content source. Once one or more stereoscopic protocols are determined, at step 56 content is communicated from the source with tags that identify stereoscopic information. At step 58, if a protocol tag is detected, then at step 60 a stereoscopic image is rendered. If no protocol tag is detected at step 58, the process continues to step 62 to render a normal image.

Although the present invention has been described in detail, it should be understood that various changes, substitutions and alterations can be made hereto without departing from the spirit and scope of the invention as defined by the appended claims.

What is claimed is:

1. An information handling system comprising:
    plural processing components operable to process information that generates images at a display using one or more stereoscopic protocols; and
    a display protocol negotiator running on one or more processing components and operable to negotiate a stereoscopic protocol with a content protocol negotiator for use in presentation of information associated with the content protocol negotiator;
    wherein the display stereoscopic negotiator is further operable to negotiate plural stereoscopic protocols and the content protocol negotiator is further operable to tag stereoscopic information with a frame protocol tag that identifies the stereoscopic protocol associated with the information.

2. The information handling system of claim 1 wherein the display protocol negotiator negotiates a stereoscopic protocol by communicating supported stereoscopic protocols to the content protocol negotiator to allow the content protocol negotiator to select a stereoscopic protocol for use in presentation of information.

3. The information handling system of claim 2 wherein the content protocol negotiator communicates information having tags that identify stereoscopic information having the negotiated protocol.

4. The information handling system of claim 1 wherein the display protocol negotiator negotiates a stereoscopic protocol by requesting available stereoscopic protocols from the content protocol negotiator, selecting a supported stereoscopic protocol from the available protocols and directing the content protocol negotiator to send the information in the selected stereoscopic protocol.

5. The information handling system of claim 2 wherein the content protocol negotiator communicates information having tags that identify stereoscopic information having the negotiated protocol.

6. The information handling system of claim 1 wherein the content negotiator comprises an application retrieved from a storage medium having the stereoscopic information, the application running on one or more of the processing components.

7. The information handling system of claim 6 wherein the storage medium comprises an optical medium.

8. A method for presenting stereoscopic content at an information handling system display, the method comprising:
    negotiating a stereoscopic protocol between the information handling system and a content source from a plurality of available protocols associated with the content;
    communicating the content from the content source to the information handling system, the content having stereoscopic information formatted in the negotiated stereoscopic protocol;
    rendering the content at the information handling system display using the negotiated stereoscopic protocol;
    wherein communicating the content further comprises tagging content frames having stereoscopic information; and rendering the tagged frames as three dimensional images; and
    wherein negotiating a stereoscopic protocol further comprises negotiating plural stereoscopic protocols and tagging content frames comprises tagging content frames with an identifier to identify which of the plural stereoscopic protocols is associated with the frame.

9. The method of claim 8 wherein the stereoscopic protocol comprises a frame interleave protocol.

10. The method of claim 8 wherein the stereoscopic protocol comprises a row interleave protocol.

11. The method of claim 8 wherein the stereoscopic protocol comprises a column interleave protocol.

12. The method of claim 8 wherein the stereoscopic protocol comprises a half resolution protocol.

13. The method of claim 8 wherein the content source comprises an optical medium.

14. A system for presenting three dimensional images at an information handling system, the system comprising:
- a content protocol negotiator associated with content having information available for communication in plural stereoscopic protocols; and
- a display protocol negotiator associated with the information handling system and operable to negotiate a stereoscopic protocol with the content protocol negotiator for communication of the content to the information handling system with the negotiated protocol;
- wherein the display protocol negotiator is further operable to tag information having the stereoscopic protocol for identification by the information handling system; and
- wherein the negotiated protocol comprises a first and second protocol and the tag identifies whether information has the first or second protocol.

15. The system of claim 14 wherein the content comprises information stored on an optical medium.

* * * * *